United States Patent [19]

Hodgkiss

[11] Patent Number: 4,901,333
[45] Date of Patent: Feb. 13, 1990

[54] DATA TRANSMISSION SYSTEMS

[75] Inventor: William Hodgkiss, London, England

[73] Assignee: The General Electric Company, p.l.c., United Kingdom

[21] Appl. No.: 26,148

[22] Filed: Mar. 16, 1987

[30] Foreign Application Priority Data

| Mar. 24, 1986 | [GB] | United Kingdom | 8607288 |
| Mar. 24, 1986 | [GB] | United Kingdom | 8607289 |
| Mar. 24, 1986 | [GB] | United Kingdom | 8607290 |
| Mar. 24, 1986 | [GB] | United Kingdom | 8607291 |
| Mar. 24, 1986 | [GB] | United Kingdom | 8607292 |
| Jan. 9, 1987 | [GB] | United Kingdom | 8700461 |

[51] Int. Cl.$^4$ .................................... H04L 27/08
[52] U.S. Cl. ........................ 375/98; 370/32.1; 375/8
[58] Field of Search ............... 379/399, 406, 410, 411, 379/58, 59, 60; 370/32, 32.1, 92; 375/39, 42, 11.15, 13, 8, 98; 455/60, 208; 381/106, 107; 330/279, 278; 364/157, 514, 571, 602, 724; 333/14

[56] References Cited

U.S. PATENT DOCUMENTS

| 4,074,086 | 2/1978 | Falconer et al. | 379/410 |
| 4,121,165 | 10/1978 | Dogliotti et al. | 329/104 X |
| 4,355,214 | 10/1982 | Levy et al. | 370/32 |
| 4,422,175 | 12/1983 | Bingham et al. | 375/14 |
| 4,457,004 | 6/1984 | Gersho et al. | 375/39 X |
| 4,539,675 | 9/1985 | Fisher | 379/411 X |
| 4,577,334 | 3/1986 | Boer et al. | 375/111 X |
| 4,621,173 | 11/1986 | Guidoux | 379/411 X |
| 4,675,863 | 6/1987 | Paneth et al. | 379/59 X |
| 4,682,358 | 7/1987 | Werner | 370/32.1 |
| 4,686,703 | 8/1987 | Bruno et al. | 379/410 |
| 4,694,469 | 9/1987 | Kaku et al. | 375/13 |

FOREIGN PATENT DOCUMENTS

0092400 10/1983 European Pat. Off.

OTHER PUBLICATIONS

"A New Digital Echo Canceller for Two-Wire Full-Duplex Data Transmission", Mueller, IEEE Transaction on Communications, vol. Com-24, No. 9 Sep. 1976 pp. 956-62 379/410.

"Microprocessor Implementation of High-Speed Data Modems", Van Gerwen et al., IEEE Transactions on Communications, vol. Com-25, No. 2, Feb. 1977 pp. 238-250.

*Primary Examiner*—Jin F. Ng
*Assistant Examiner*—Randall Vaas
*Attorney, Agent, or Firm*—Kirschstein, Ottinger, Israel & Schiffmiller

[57] ABSTRACT

A modem for a digital data transmission system in which binary-coded data at up to 9.6 Kbit/sec is transmitted over a telephone line pair circuit, as phase and amplitude modulation (QAM) of a carrier signal at a frequency of 1800 Hz, at a line symbol rate of 2400 bauds. The modem utilizes two data signal processors (4 and 5) and two gate arrays (6 and 7), controlled by a microprocessor (8), to carry out digitally all the processes required to convert binary coded data signals into PCM coded samples of the required carrier signal for transmission and to recover binary coded data signals from PCM coded samples of a received carrier signal.

1 Claim, 11 Drawing Sheets

| INPUTS | | PREVIOUS O/Ps | | NEW O/Ps | |
|---|---|---|---|---|---|
| Q1(i) | Q2(i) | Y1(i-1) | Y2(i-1) | Y1(i) | Y2(i) |
| 0 | 0 | 0 | 0 | 0 | 1 |
| 0 | 0 | 0 | 1 | 1 | 1 |
| 0 | 0 | 1 | 0 | 0 | 0 |
| 0 | 0 | 1 | 1 | 1 | 0 |
| 0 | 1 | 0 | 0 | 0 | 0 |
| 0 | 1 | 0 | 1 | 0 | 1 |
| 0 | 1 | 1 | 0 | 1 | 0 |
| 0 | 1 | 1 | 1 | 1 | 1 |
| 1 | 0 | 0 | 0 | 1 | 1 |
| 1 | 0 | 0 | 1 | 0 | 1 |
| 1 | 0 | 1 | 0 | 1 | 0 |
| 1 | 0 | 1 | 1 | 0 | 0 |
| 1 | 1 | 0 | 0 | 1 | 0 |
| 1 | 1 | 0 | 1 | 0 | 0 |
| 1 | 1 | 1 | 0 | 1 | 1 |
| 1 | 1 | 1 | 1 | 0 | 1 |

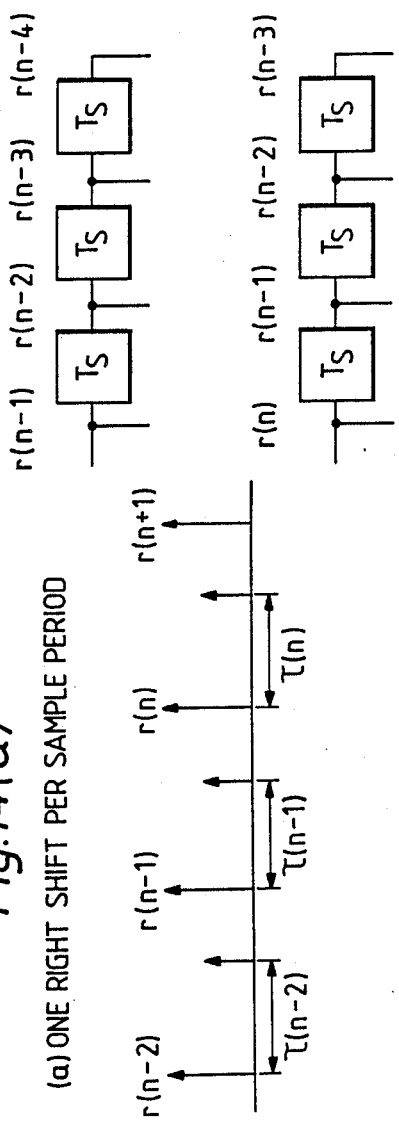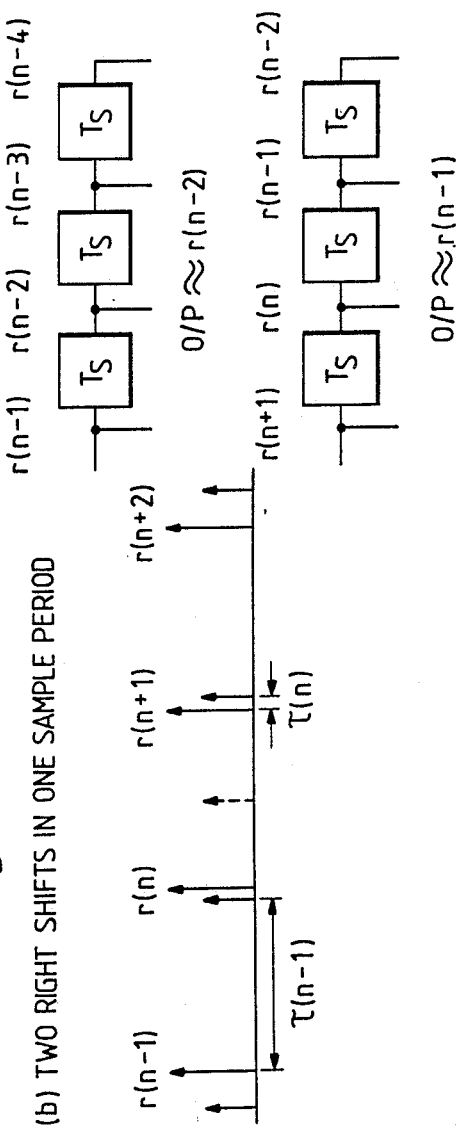
Fig.14(a)
(a) ONE RIGHT SHIFT PER SAMPLE PERIOD
Fig.14(b)
(b) TWO RIGHT SHIFTS IN ONE SAMPLE PERIOD

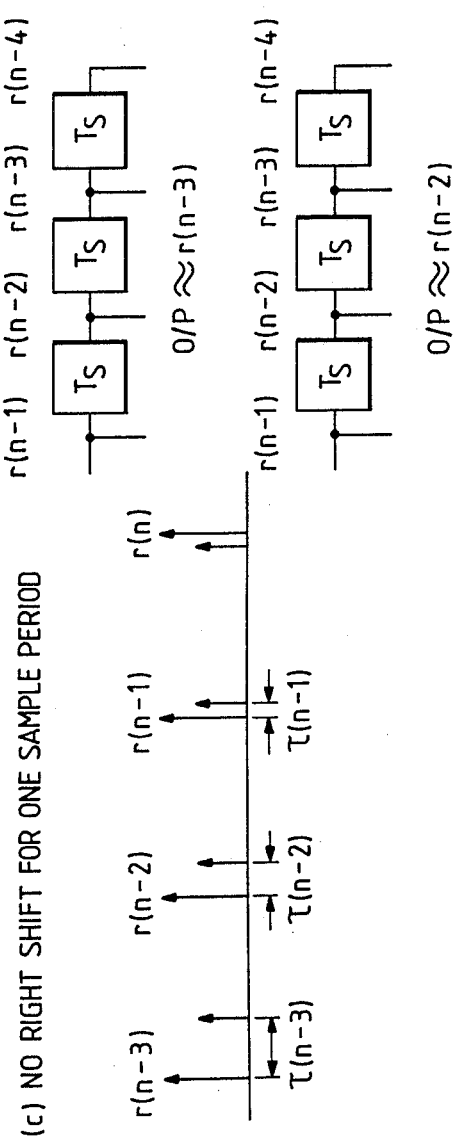

DATA TRANSMISSION SYSTEMS

BACKGROUND OF THE INVENTION

1. Field of the Invention

The present invention relates to data transmission systems.

In particular but not exclusively the invention relates to modulator/demodulator arrangements, or modems, for data transmission systems in which data signal values to be transmitted are represented in transmission by phase and amplitude values of two electric carrier signals of the same frequency but in phase quadrature.

SUMMARY OF THE INVENTION

According to one aspect of the present invention in a data transmission system in which data signal values to be transmitted over the system are represented in transmission by phase and amplitude values of two electric carrier signals of the same frequency but in phase quadrature, a modem comprises digital signal processor means responsive to input data signal values to supply digital electric output signals which represent in pulse code modulation form the required phase and amplitude values of successive samples of the two electric carrier signals, and a digital-to-analogue converter which derives said carrier signals from said digital output signals.

Preferably said modem comprises further digital data signal processor means responsive to digital electric signals, which represent in pulse code modulation form the amplitude values of successive samples of electric carrier signals received over said system, to recover binary data signal values therefrom.

In such data transmission systems it may be required for a modem at a station of the system to transmit and receive signals of specific harmonically-related frequencies, or tones, for example in setting up an exchange of information or data signals. The necessary tone detector must be capable of detecting received tone signals while rejecting any echoes of transmitted signals.

Accordingly there may be provided a tone detector arrangement for detecting, in electric signals at an input to the arrangement, the presence of a selected one of a plurality of tone signals having harmonically related frequencies, comprising means periodically to sample the amplitude of the signals at said input at a predetermined rate and to pulse code the amplitude sample values, and means periodically to carry out a discrete Fourier transform process in respect of a limited number of sample values, the product of this number of sample values and the minimum frequency interval between said harmonically related frequencies being equal to or a multiple of the predetermined sampling rate.

A carrier signal waveform received over the system by the modem may be periodically amplitude-sampled and pulse coded to provide a first sequence of encoded samples at time intervals determined by a first series of clock signals, and a second sequence of digitally encoded samples representing said carrier signal waveform at time intervals determined by a second series of clock signals in general not synchronised with said first series of clock signals may be derived from said first sequence by a transversal filter process.

Preferably there are provided means responsive to the relative timing of clock signals of said first and second series to select tap weight values for said transversal filter process, a plurality of different sets of these tap weight values being held in a read-only memory for this purpose. The first sequence of encoded samples may be provided at time intervals determined by transmitter clock signals for the purpose of digital echo cancellation, and the second sequence of encoded samples at time intervals determined by the received signal components of the carrier signal waveform.

There may be provided means periodically to generate a pulse code group defining an approximation to an amplitude sample value of a received carrier signal waveform, digital-to-analogue converter means to derive analogue sample values from the respective pulse code groups, and comparator means to compare each approximation to an amplitude sample value with an actual received sample value, the digital signal processor means being responsive to the result of said comparison to cause said second code group, by successive approximation, to define an amplitude sample value substantially equal to said actual received amplitude sample value.

Received carrier signals may be arranged to be periodically sampled and digitally encoded, and there may be provided an automatic gain control arrangement comprising means digitally to determine the average magnitude of encoded sample values, means to derive a reciprocal of said average magnitude, and means digitally to multiply each of said encoded sample values by said reciprocal of said average magnitude.

According to another aspect of the invention in a modem for a data transmission system in which digital signal processor means are arranged to derive from input data signals a succession of digital values representing respective amplitude and phase values of a carrier signal to be transmitted, and to derive from pulse coded sample values of a carrier signal on a receive path of the modem data signals conveyed by said carrier signal on said path, an echo canceller arrangement comprises a gate array processor responsive to said digital values to derive a succession of pulse coded echo cancelling signals for subtraction from said pulse coded signals representing said sample values of the received carrier signal.

According to another aspect of the present invention in a data transmission system in which data signal values transmitted and received over the system are represented in transmission by amplitude and/or phase modulation of a carrier signal waveform, a modem comprises digital signal processor means responsive to input data signal values to derive digital signals which represent the amplitude and phase of the carrier signal waveform to be transmitted, said digital signal processor means being arranged to derive from said digital signals a succession of pulse code groups representing respective amplitude samples of band-width limited carrier signal waveform, and digital to analogue converter means to derive said waveform from said succession of pulse code groups.

BRIEF DESCRIPTION OF THE DRAWINGS

A modem for a data transmission system, the modem being in accordance with the present invention will now be described with reference to the accompanying drawings, of which:

FIGS. 4, 5, 6, 7, 8, 9, 10, 11, 12, 13, 14(a), 14(b), 14(c), and 15 illustrate in detail some of the functions shown in FIG. 1.

DETAILED DESCRIPTION OF THE PREFERRED EMBODIMENT

The modem is designed to meet requirements originally set out in CCITT draft recommendation V.aa (V.32), published in Com. XVII-R5-E, December 1983, pp 11–51. In accordance with that recommendation a V32 modem is required to transmit binary-coded data at either 4.8 Kbit/s. or 9.6 Kbit/s. as phase and amplitude modulation (QAM) of an 1800 Hz carrier signal at a line symbol rate of 2400 baud/s. over a conventional telephone line pair, and to receive signals from the line pair in similar format and recover the binary-coded data. For a 4.8 Kbit/s. data rate a 4 QAM format is proposed, while for a 9.6 Kbit/s. data rate either a 16 QAM or a 32 QAM format is proposed, depending on whether a 4/5 convolution or trellis code is used. In either case the spectrum of the modulated signals is then to be shaped to fall within the nominal 3 KHz voiceband.

Figure 1:
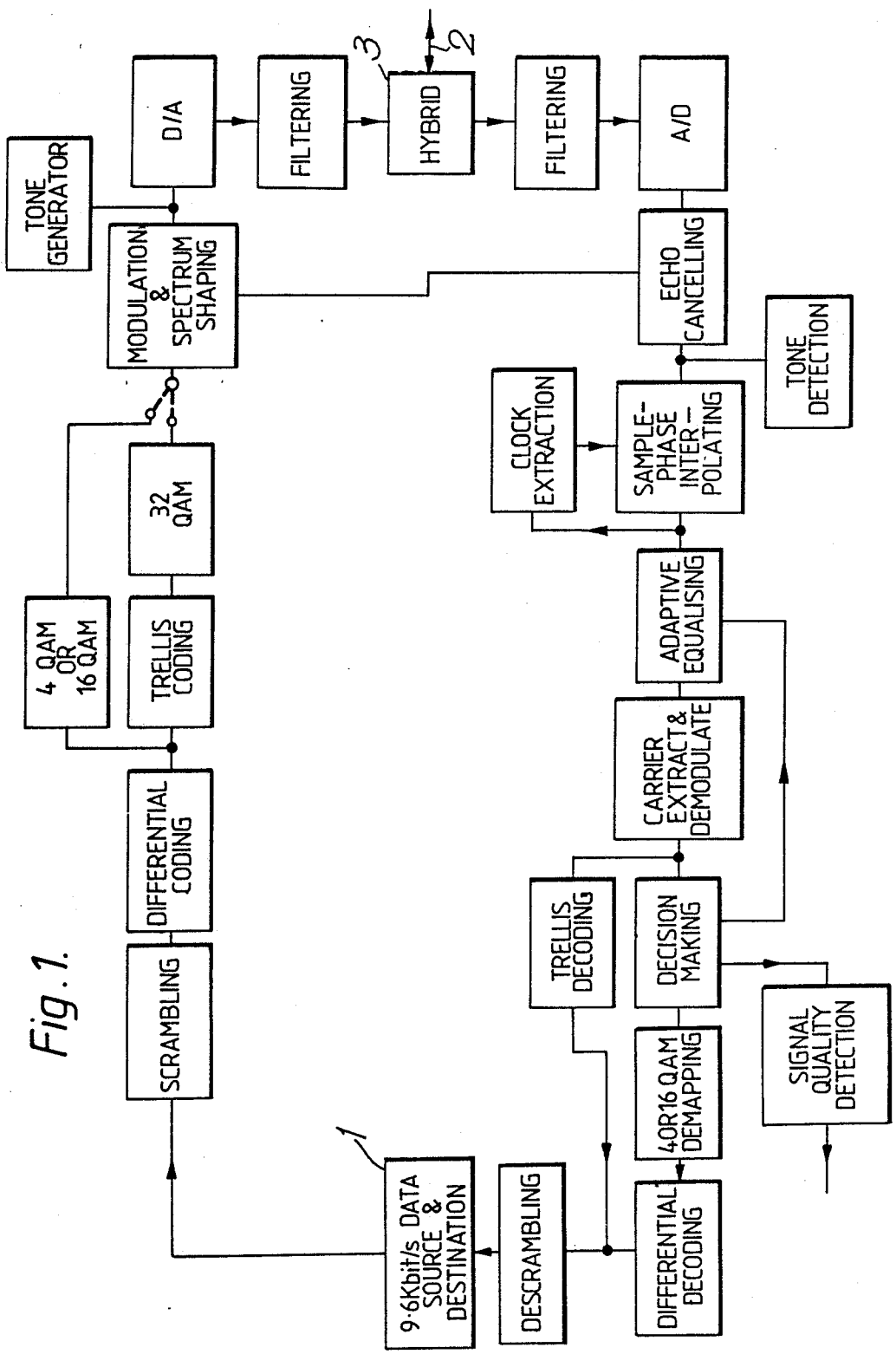
FIG. 1 sets out in block schematic form the principal functions of the modem.

Referring first to FIG. 1, the various functions or processes to be carried out by the modem in preparing, say, a 9.6 Kbit/s. data stream for transmission, or in recovering the data stream from received signals, are represented by respective blocks. Thus a stream of bit values from a source 1 is subjected to scrambling, differential coding and mapping in preparation for modulation of two 1800 Hz carrier signals which are in phase quadrature, the filtered carrier signals then being converted from digital to analogue form and filtered again before being applied to a line pair 2 by way of hybrid 3.

Modulated carrier signals received over the line 2 are filtered and converted to digital form for processing to recover the received data stream, the stages of echo cancelling, automatic gain control, sample-phase interpolation, equalising, demodulating, de-mapping, decoding and de-scrambling then being carried out entirely digitally.

Figure 2:
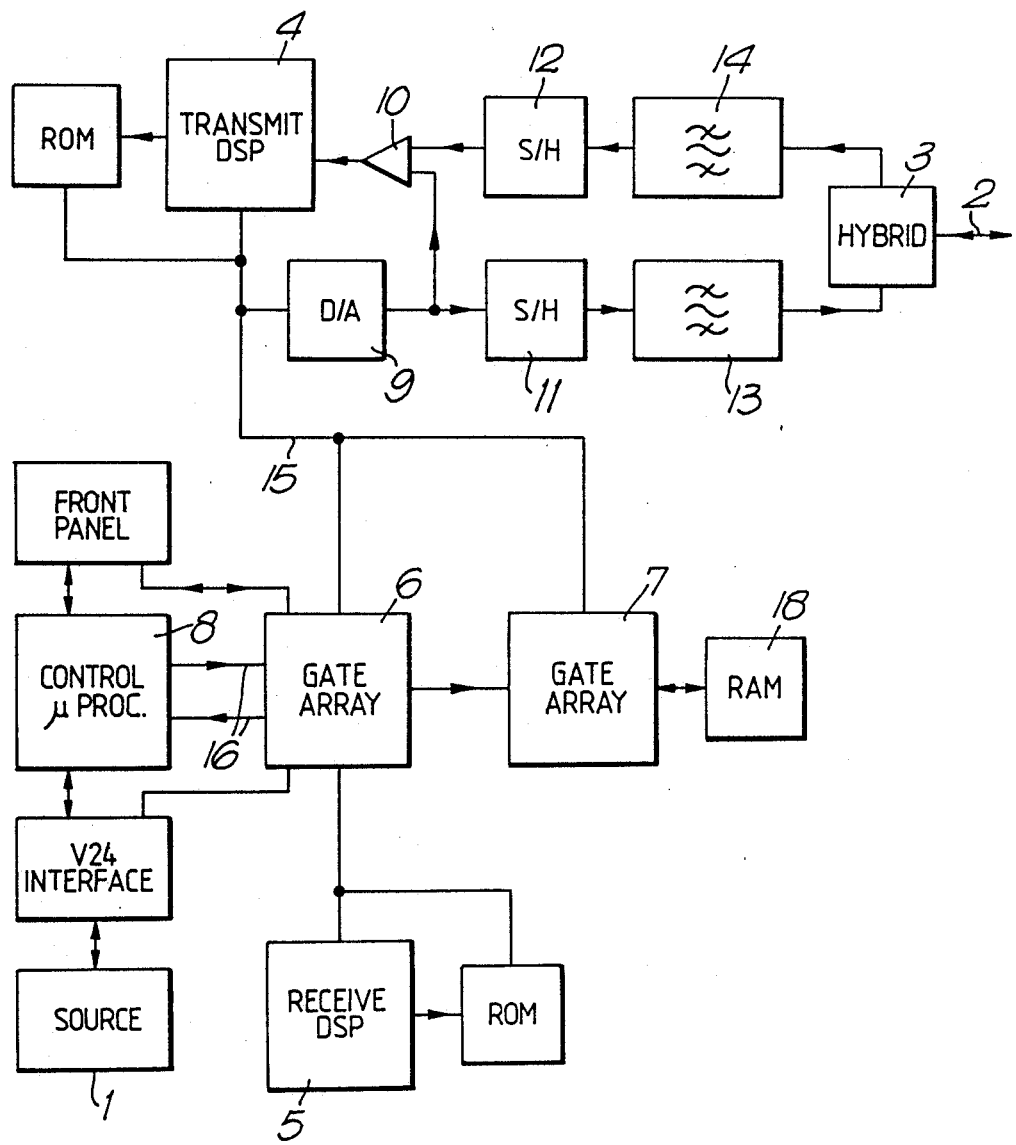
FIG. 2 shows diagrammatically an implementation of the modem.
Figure 3:
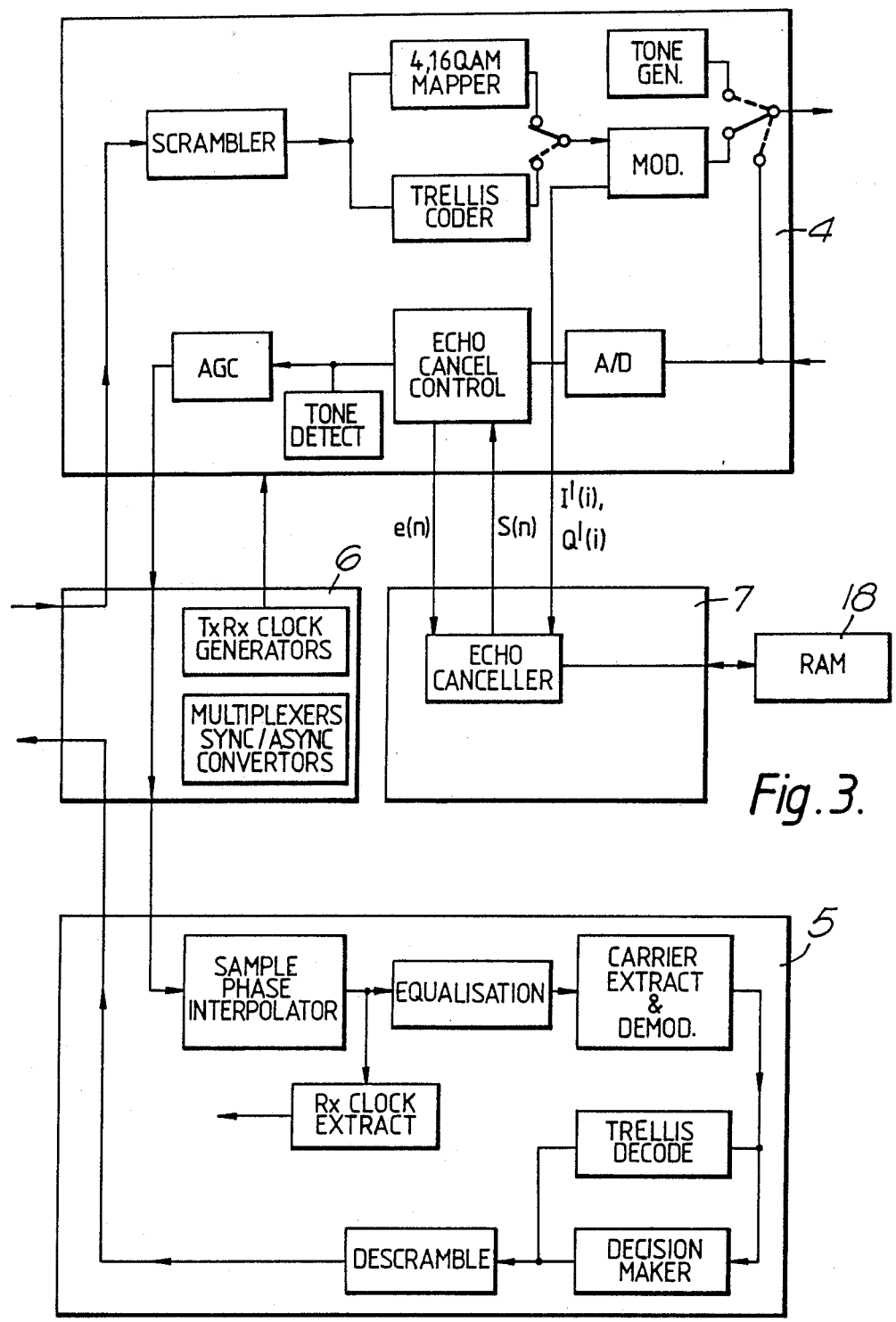
FIG. 3 shows schematically the allocation of some of the functions shown in FIG. 1 between the different units shown in FIG. 2.

Referring also to FIGS. 2 and 3 most of these functions are carried out by means of two digital signal processors 4 and 5 and two gate arrays 6 and 7, under the control of a micro-processor 8, the only analogue circuits required being a digital-to-analogue convertor 9, a comparator 10, two sample-and-hold circuits 11 and 12, an interpolation filter 13 and an anti-aliasing filter 14. The allocation of the digital signal processing functions between the processors 4 and 5 and the gate arrays 6 and 7 are indicated in FIG. 3. The processors 4 and 5 may, for example, be Texas Instruments TMS 32010 and TMS 32020 digital signal processors respectively, each capable of working at an instruction rate of 5 MHz and incorporating a 16 bit processor, a 16 bit multiplier and data stores. The gate array 6 is required to provide about 3000 gates, and the array 7 about 4200, while the control microprocessor 8 may be a type Z80 8 bit microprocessor. The control microprocessor 8, the gate arrays 6 and 7, and the processors 4 and 5 are interconnected by an 8 bit data bus 15 and by a control or address bus 16.

Figures 4, 5:
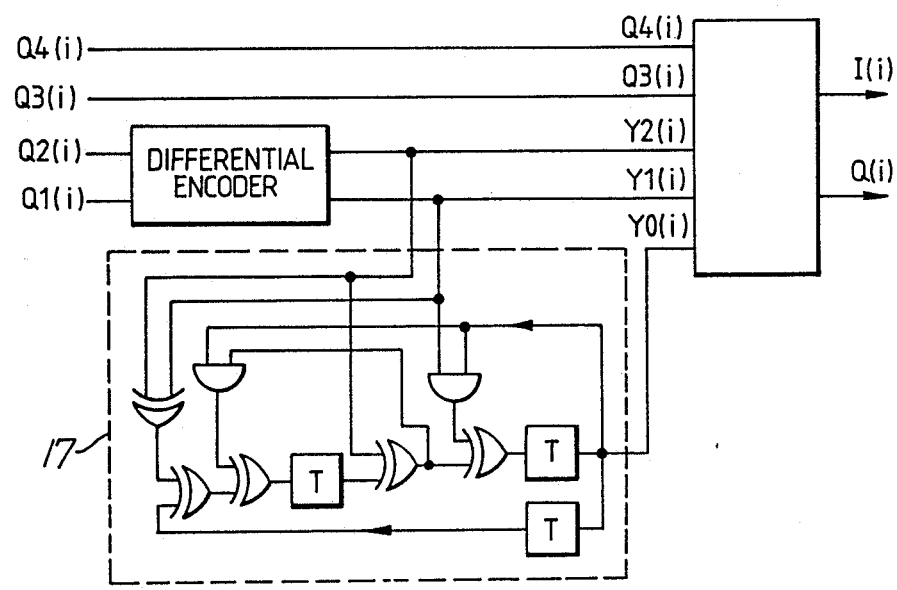
Figure 6:
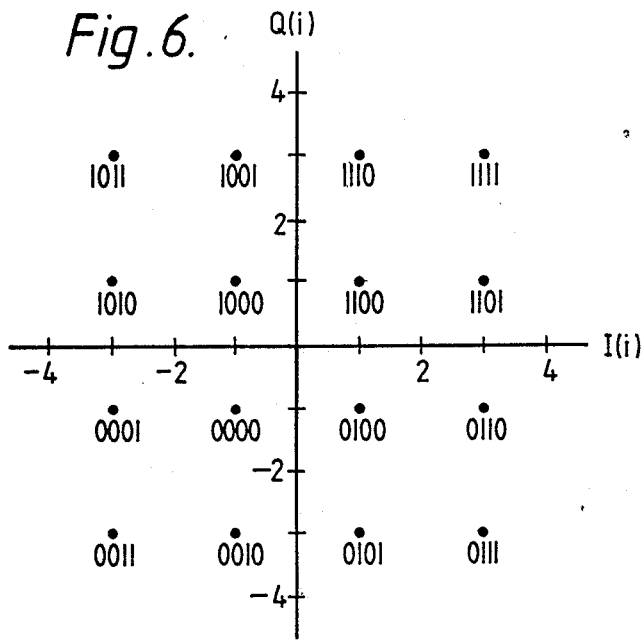

Referring now to FIGS. 4, 5 and 6, in the transmitter section of the modem, after the scrambling process, the data bit values of the 9.6 Kbit/s. stream are divided into 4-bit blocks, the block of 4 bit values associated with, say, the $i^{th}$ transmitted symbol period being denoted as Q1(i), Q2(i), Q3(i), Q4(i). The first two bit values Q1(i) and Q2(i) are differentially coded, for example in accordance with a look-up table of the form given in FIG. 5, as Y1(i) and Y2(i), and the four bit values Yi(i), Y2(i), Q3(i), Q4(i) are then mapped as shown in FIG. 6, with the so-called phase bits Y1(i) and Y2(i) determining the phases and the bits Q3(i) and Q4(i) determining the amplitudes of the quadrature carriers in respect of the $i^{th}$ transmitted symbol period.

If trellis coding is to be employed a different form of differential coding is used and a convolution coding process equivalent to that represented by the logic circuit 17 in FIG. 4 is carried out, producing an extra bit Y0(i), and the subsequent 32 QAM mapping (not shown) is carried out on the basis of the five bits d0(i), Y1(i), Y2(i), Q3(i) and Q4(i).

The mapping in respect of any one symbol period produces in-phase and quadrature signals I(i) and Q(i) respectively each of which, as can be seen from FIG. 6, may have a value of −3, −1, 1 or 3 according to the values of the bits Y1(i), Y2(i), Q3(i), Q4(i).

Figure 7:
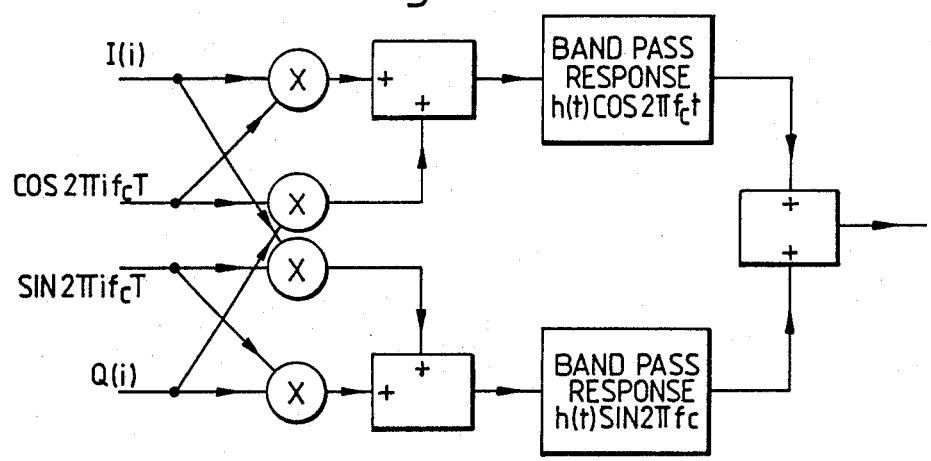
Figure 8:
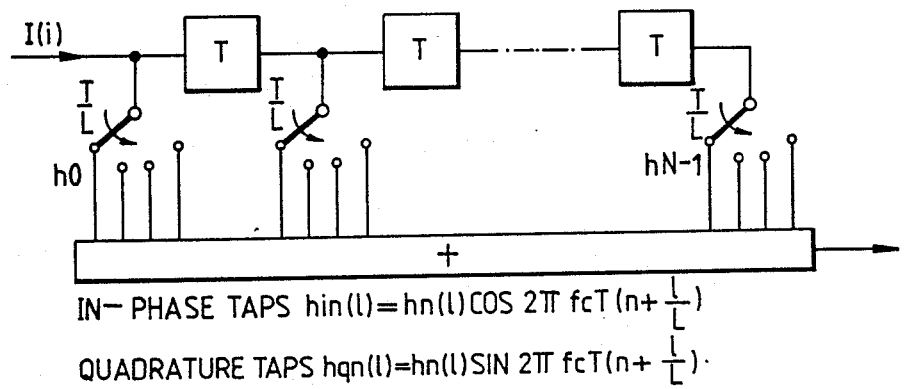

Referring to FIGS. 7 and 8, the signals I(i) are utilised to form the quadrature carrier signals digitally, within the processor 4, as sequences of 12-bit pulse coded modulated amplitude sample values, which are then combined and converted to analogue form for transmission over the line 2. The sample rate chosen is 9.6 KHz, so that at the symbol rate of 2.4 KHz just four amplitude samples have to be generated in respect of each of the values I(i) and Q(i). It will be appreciated that for an 1800 Hz carrier signal each transmitted symbol period is only three quarters of a cycle long.

The necessary spectrum shaping, or bandwidth limiting, to keep the modulated carried signals within the 3 KHz voiceband, is also carried out digitally within the processor 4. A suitable spectrum, for example having a raised cosine form with a predetermined "roll-off", or bandwidth in excess of the symbol rate of 2.4 KHz, may be defined, and the required response realised, by means of a transversal filter process of the form illustrated in FIG. 8. The length of the transversal filter process, set by the number of symbol periods it spans, governs the spill-over of energy outside the specified raised cosine response function. In the present arrangement the filter process extends over six symbol periods.

The required modulated signal is formed as:

$$S(t) = Re \sum_i IQ(i) \, h(t - iT) \cdot \exp j2\pi f_c t$$

where

IQ(i) = I(i) + jQ(i) and h(t) represents the required filter impulse response, expressed here as a continuous function in time.

This can be rewritten as:

$$S(t) = Re \sum_i [IQ(i) \exp \cdot j2\pi f_c iT] \, [h(t - iT) \exp \cdot j2\pi f_c (t - iT)]$$

Since $$f_c T = 1800 \times \frac{1}{2400} = \frac{3}{4},$$

the sine and cosine values resulting from the first part of the above expression reduce to a succession of values 1, 0, −1, 0, and so on for successive values of i, as indicated in the table in FIG. 7.

The "modulation" part of the modulation and spectrum shaping process may therefore be carried out as a succession of multiply-and-add steps which amounts to a selection process, repeating every four symbol periods, to generate modulated data signals I'(i) and Q'(i).

The second part of the above expression requires a transversal filter process to be carried out on each of I'(i) and Q'(i), with bandpass impulse responses of the form h(t) cos 2]0 $f_c$t and h(t) sin $2\pi f_c$t respectively.

The tap values for these transversal filter processes are pre-calculated in accordance with the required spectrum shaping and stored in a look-up table.

The combined outputs from the transversal filter processes, in the form of 12-bit coded amplitude samples at the sample rate of 9.6 KHz, are decoded by the digital-to-analogue convertor 9, and the respective sample values set up in the sample and hold circuit 11 are applied to the low-pass interpolation filter 13, which in turn passes the required bandwidth limited phase and amplitude modulated carrier signal to the line pair 2.

Referring again to FIG. 2 analogue signals received from the line pair 2 pass by way of the low-pass anti-aliasing filter 14 to the sample-and-hold circuit 12, where the analogue signal amplitude is sampled at a rate of 9.6 KHz. In each of a succession of processing steps between transmitter functions carried out by the processor 4 a 12-bit code group is generated by the processor 4, is decoded by the digital-to-analogue converter 9 and the resulting analogue value is compared in the comparator 10 with a received sample value held by the sample-and-hold circuit 12. By successive approximation the code group generated in the processor 4 is then set so as to represent the received sample value in pulse code modulated form to 12-bit accuracy.

At the first approximation the processor 4 generates a code groups corresponding to zero volts. At the second approximation the processor 4 alters the code group to add ±V/2 volts to this level (where ±V volts is the maximum voltage range) according to the sign of the error between the received sample and the first approximation. At the $n^{th}$ approximation the process 4 adds ±V/n volts to the previous output. The twelve approximations are arranged to be completed before the next transmitted sample is converted.

Figure 9:
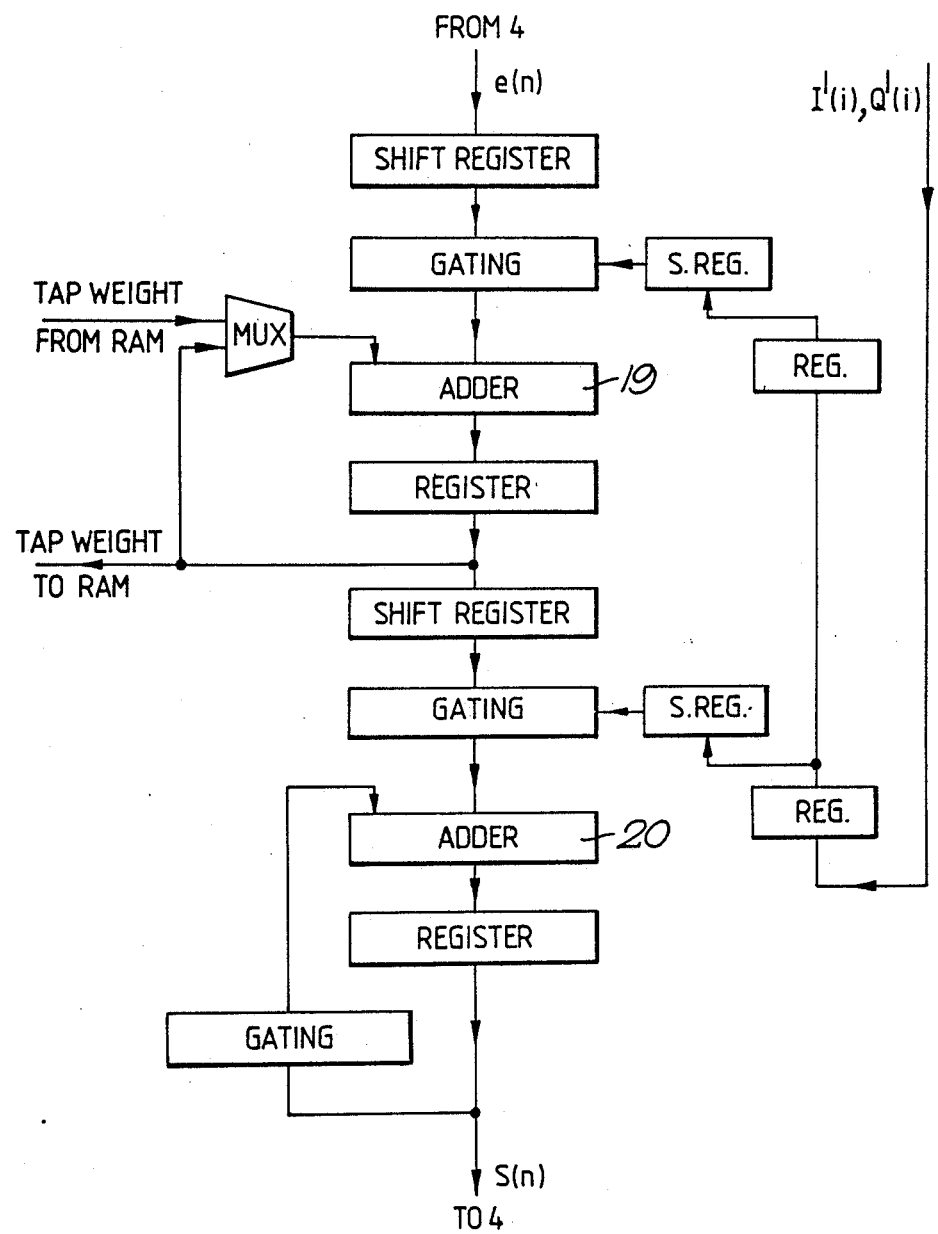

Referring now to FIGS. 3 and 9, echoes of the transmitted signal which arise from impedance mismatches in the hybrid 3 and in the hybrid (not shown) at the other end of a trunk connection, and which appear in the receive path, are cancelled in the processor 4, after the analogue to digital conversion, by subtracting from each pulse coded sample of the received signal a correspondingly pulse coded signal S(n) generated in the gate array 7. The signal resulting from the subtraction process is returned to the gate array 7 as an error signal e(n) for the purpose of adapting the echo canceller process and hence the generated value of the signal S(n). Ideally this error signal e(n) will consist only of data signal values r(n) received over the line pair 2 from the far end modem, although in practice there will be a residual echo component caused by the received data signal component which though uncorrelated with the transmitted signal echo will tend to perturb the value of S(n) generated.

The echo cancelling signal S(n) is generated from the same modulated data signals I'(i) and Q'(i) used in the modulation and spectrum shaping process of the transmission side of the modem. It has been found that within the United Kingdom public telephone network echoes may last for twenty to thirty milliseconds, and in the present modem the echo cancelling signal S(n) in respect of any one sample period is therefore made dependent upon the data signal values for sixty preceding symbol periods, which at the symbol rate of 2.4 KHz extend over a period of twenty five milliseconds.

The signal S(n) is generated by a transversal filter process extending over the sixty symbol periods, as $$S(n) = \sum_{m=0}^{m=59} [I'(i - m) c'_{m,1} - Q'(i - m) d'_{m,1}]$$

where $c'_{m,1}$ and $d'_{m,1}$ are adaptive tap weights for the sixty symbol periods m=0 to m=59 and the four samples per symbol period 1=0 to 1=3, derived as $$c'_{m,1}(i+1) = c'_{m,1}(i) + \alpha I'(i-m).e(n)$$

$$d'_{m,1}(i+1) = fc'_{m,1}(i) + \alpha Q'(i-m).e(n)$$

where
e(n)=ne(n)+fe(n)−S(n)+r(n)
ne(n=near-end echo
fe(n)=far-end echo
r(n)=received data signal
α=adaption constant The echo canceller tap values are initially set during the start-up sequence, when predetermined signals are transmitted for predetermined periods by the two modems in turn, and the adaption constant α may be set to an optimum value for rapid convergence in the absence of any interference from received data signals r(n). When full duplex operation commences the value of adaption constant α is reduced, so that the adaption process continues but at a slower rate.

In order to provide sufficient accuracy for the adaption of the echo cancelling process in the presence of received data signals, while providing suitably rapid convergence during startup, it has been found that the tap weight values c'(i) and d'(i) have to be stored to considerably greater than the 16-bit accuracy required in the output S(n), and in the present modem these values are stored to 24-bit accuracy, as three 8-bit bytes in a discrete random access memory 18 (FIG. 1).

Part of the gate array 7 is configured as two separate multiplier/adders 19 and 20, as shown in FIG. 9, the multiplier/adder 19 being utilised in the tapweight adaption and having 24 bit precision and the multiplier/adder 20 being utilised to accumulate the echo canceller signal S(n) and having 20 bit precision. Other parts of the gate array 7 are configured respectively as a modulo-26 counter to derive from a master clock signal at 14.976 KHz a basic time frame for the adaption of each tapweight pair, and as cyclic counters for timing the addressing of the random access memory 18.

Figure 10:
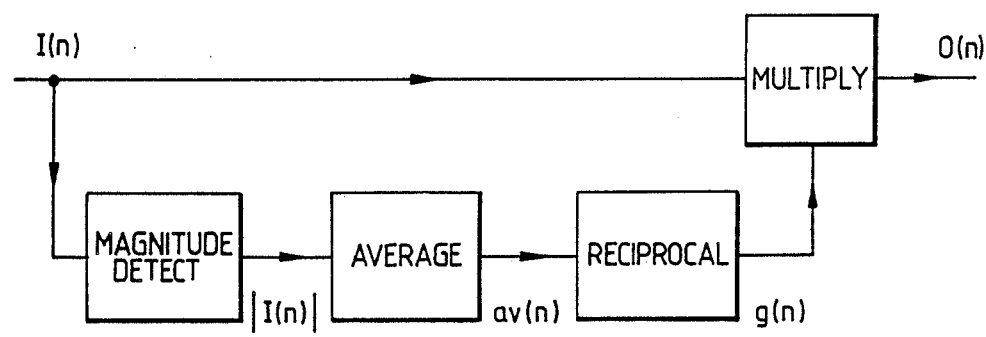
Figure 11:
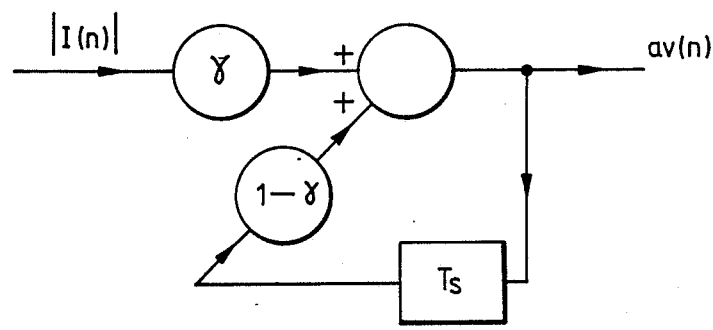
Figure 12:
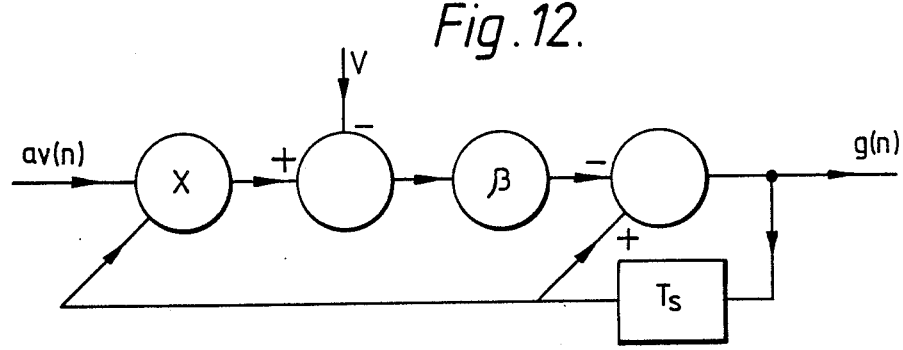

Referring now to FIGS. 10, 11 and 12, the automatic gain control process, although part of the receive function of the modem, is carried out by the transmit data processor 4, after analogue to digital conversion of a received signal and after the echo cancelling process.

The automatic gain control is effected by a feed-forward process in which each coded sample value is multiplied by a value proportional to the reciprocal of the average magnitude of these coded sample values.

The average magnitude av(n) during any sampling period is derived in accordance with:

$$av(n) = av(n-1) + \gamma[|I(n)| - av(n-1)]$$

as shown in FIG. 11, by a first order low-pass filter process having a time constant of $T_s/\gamma$ where Ts is the reciprocal of the sampling rate.

The reciprocal value $$g(n) = \frac{V}{av(n)}$$

is derived by iteration in accordance with Newton's successive approximation method, whereby:

$$g(n) = g(n-1) - \frac{f[g(n)]}{f'[g(n)]}$$

which leads to:

$$g(n) = g(n-1) - \frac{1}{av(n)} \cdot [g(n-1) \cdot av(n) - V]$$

The term $$\frac{1}{av(n)}$$

must be set as a predetermined constant $\beta$, and analysis of the stability of the process shows that it should be set as:

$$g(n) = g(n-1) - \beta[g(n-1) \cdot$$

$$av(n) - V] \text{ where } \beta = \frac{1}{av(n)\text{Max}}$$

This process is illustrated in FIG. 12.

With digital signal processor implementation the required division and multiplication steps can be carried out linearly, and the gain control can be achieved with perfect regulation and with no instability.

In order to carry out the echo cancelling digitally, as described above, the transmitter clock is used to time the sampling and coding of the received analogue signal. However, in general the far-end transmitter clock will not be synchronous with the near-end transmitter clock, and once the echo cancelling has been carried out the received signals have to be re-sampled in step with an extracted receiver clock signal.

Figure 13:
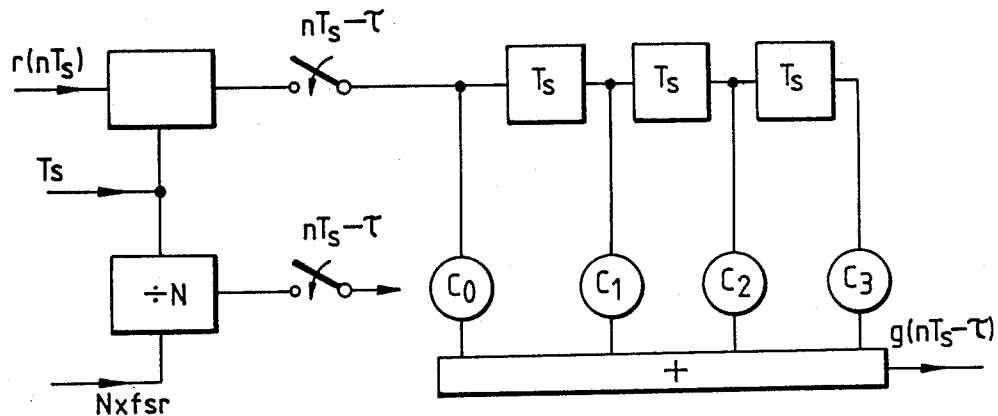

The re-sampling, or interpolation, is achieved digitally by means of a four tap transversal filter process of the form illustrated in FIGS. 13 and 14 in which received samples r(n) from the echo canceller, timed by the transmitter clock, are entered into and moved along the filter a symbol intervals timed by the extracted receiver clock. In general the transmitter and receiver clocks will be out of step by an amount represented by the delay $\tau$ between the occurrence of a transmitter symbol clock signal and a receiver symbol clock signal, this delay being measured as a fraction of the receiver symbol period by a modulo-64 counter which is reset by a transmitter clock signal and is clocked up at a rate of sixty four times the receiver symbol clock rate until the next receiver symbol clock signal occurs.

The read-out of receiver-timed samples is subject to an overall delay of between one and two receiver symbol periods, that is, between the two central tapping points, with the two outer taps also contributing. Due to the drift in the delay $\tau$ arising from differing transmitter and receiver clock frequencies there will be occasions when two transmitter symbol clock signals will occur between successive receiver symbol clock signals, as in FIG. 14(b), or when two receiver symbol clock signals will occur between successive transmitter symbol clock signals, as in FIG. 14(c). In the first of these cases a transmitter-timed sample value received from the echo canceller may be missed, and in the second case a transmitter-timed sample value may be read twice, resulting in inaccuracy in the values read out of the interpolator.

In order to avoid this inaccuracy the successive count values reached by the modulo-64 counter are compared, and in the situation represented in FIG. 14(b) an extra signal sample "read" is made halfway through a symbol period in order to enter the sample r(n) which would otherwise be missed, while in the situation represented by FIG. 14(c) the second receiver symbol clock signal after the sample r(n−1) is arranged not to step the transversal filter process, so that the sample r(n−1) is not clocked twice.

With this correction applied to the sample values utilised in the transversal filter the receiver-timed sample value may then reliably be obtained from between the second and third taps with the actual delay value determined by the count reached by the modulo-64 counter. The respective sets of tap weight values $C_n$, n=) to 3, required for the sixty four possible values of $\tau$ are pre-calculated and stored as a look-up table addressed in accordance with the count. These tap weight values are calculated to minimise the mean square error between the output signal of the filter and the desired delayed input signal, and are dependent upon the spectrum of input signals.

In setting up a data transmission path utilising two V32 modems an initial "hand-shake" procedure of tone signal exchanges is followed in order to establish timing references and to train adaptive echo cancellers, equalisers and decoders. Further exchanges of tone signals may be required during normal transmission if a modem detects a need to retrain its receiver.

A tone detector is therefore required to monitor received signals continuously to detect the presence and the phase of tones at specific frequencies. In accordance with the V32 specification the tones transmitted are at 600 Hz, 1800 Hz and 3000 Hz, but it may be sufficient to detect only 600 Hz and 1800 Hz tones, since certain of the tone sequences utilised may be recognised by the presence of 600 Hz only. The tone detector must when set to detect one particular tone reject interference from the other tones generated simultaneously by the modem transmitter which appear in the input path since they are not at this particular stage in the handshake cancelled by the echo canceller.

Figure 15:
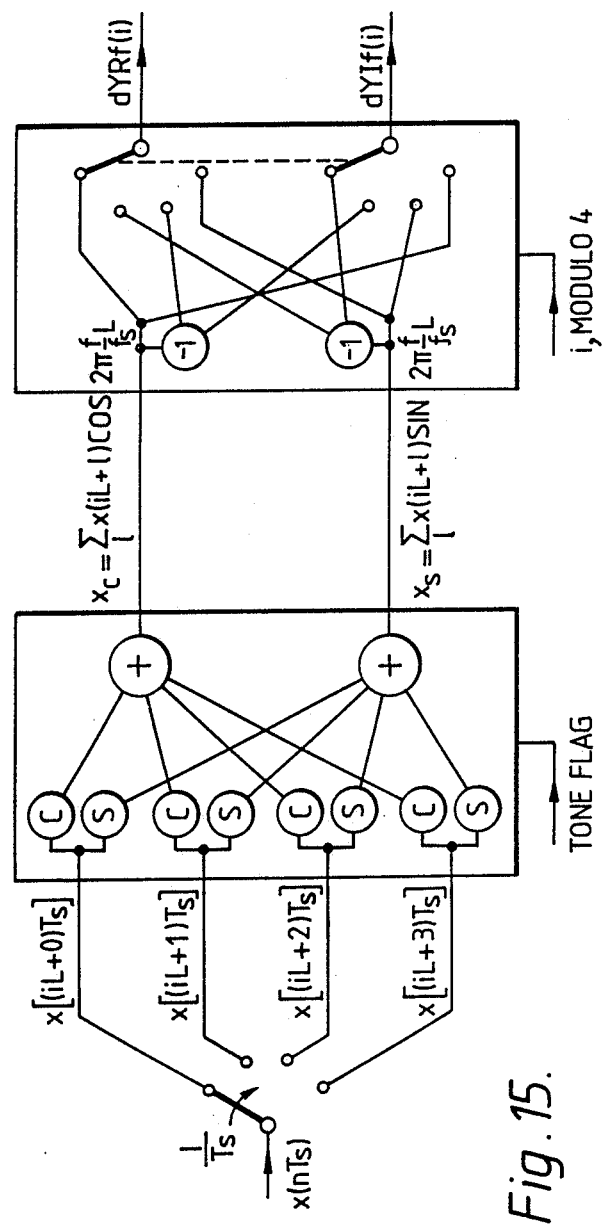
Figure 15:
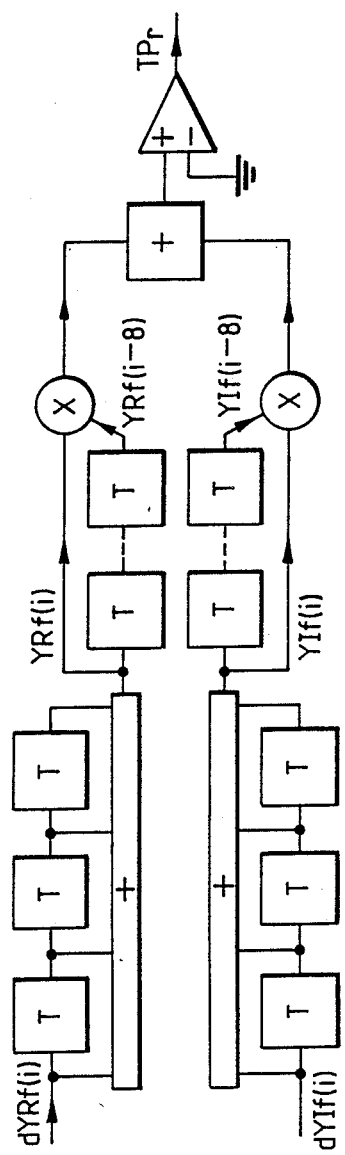

Referring now to FIG. 15, a discrete Fourier transform process is utilised to effect the detection of a selected tone and the rejection of the unselected tones, the transform in respect of discrete samples $x(nT_s)$ sampled at a rate $f_s = 1/T_s$ being given by:

$$X(f) = \frac{1}{N} \sum_{n=0}^{N-1} x(nT_s) \exp{-(2\pi nf/f_s)}$$

This equation enables the evaluation of all the frequency components in $x(nT_s)$ under two conditions (which can only ever be approximately true):

(a) that the original analogue signal had no frequency components above half the sampling frequency $f_s$.

(b) that the analogue signal value was zero outside the range $0 \leq t \leq NT_s$.

In the present case condition (b) will not be valid since it is necessary to carry out tone signal detection on a small number of samples in order to determine accurately the timing of phase reversals, whereas the signal is in fact non-zero beyond this small number of samples.

The effect of this is that the transform becomes an "estimate" Y(f) equivalent to the transform of the original signal $x(nT_s)$ multiplied by a window function $w(nT_s)$ which is defined as having the value $w(nT_s)=1$ when $0 \leq n \leq N-1$ and zero outside that range.

It can be shown that the relationship between X(f) and Y(f) is given by the convolution:

Y(f)=X(f)*W(f)

where W(f) is the spectrum of the window function $w(nT_s)$.

The spectrum W(F) can be shown to be of the form:

$$W(f) = \frac{\sin N\pi f/f_s}{\sin \pi f/f_s}$$

This spectrum has zeros at multiples of $f_s/N$. Thus if X(f) consists of a wanted tone frequency f plus unwanted tones differing by multiples of $f_s/N$ then the window function will ensure their rejection. Since all the tones utilised in the present modem are multiples of 600 Hz and the sampling rate is 9.6 KHz, if N=16 is chosen (or any multiple of 16) this rejection will be achieved.

As far as detecting phase reversals is concerned a previous estimate Y(f) can be used as a reference, the test being performed once in each symbol period.

Assuming that:

Yf(i)=YRf(i)+jYIf(i)

is the estimate of the tone at the current symbol i, and:

Yf(i−M)=YRf(i−M)+jYIf(i−M)

is the estimate established M symbols previously, where M symbol periods span the worst-case dispersion of the telephone network, then the relative phase of these vector quantities will indicate whether a phase reversal of the tone has occurred. The phase angle $\theta$ between the vectors would normally be in the range:

$-\pi/2 < \theta < \pi/2$ so that if $\cos \theta \leq 0$ a phase reversal has occurred.

The dot product of the two vectors is given by :

Yf(i).Yf(i−M)=|Yf(i)||Yf(i−M)| cos
$\theta$=YRf(i)YRf(i−M)+YIf(i)YIf(i−M)

so that the test is satisfied if the dot product is less than or equal to zero. The dot product can also be used to detect the presence of a wanted tone by its persistence since it will remain positive while the successive estimates Y(f) remain in phase. If solely random background noise or random modulated data is present then the dot product will be randomly positive or negative.

The estimate in terms of a number of samples N (=16) may be expressed as:

$$Yf(n = N) \frac{1}{N} \sum_{n=0}^{N-1} x(n) \exp \cdot (-2\pi f/f_s)$$

In terms of the symbol index i and sample index l:

n=iL+l where L is the number of samples per symbol period, L=4 in the present case.

The estimate then becomes:

$$Yf\left(i = \frac{N}{L}\right) = \frac{1}{N} \sum_{i=0}^{N/L-1} \sum_{l=0}^{L-1} x(iL + l)\exp \cdot$$

$$[-(iL + l)2\pi f/f_s]$$

$$\text{or } Yf\left(i = \frac{N}{L}\right) = \frac{1}{N} \sum_{i=0}^{N/L-1} dYf(i)$$

—where $dYf(i) = \exp \cdot$ $$(-iL2\pi f/f_s) \sum_{l=0}^{L-1} x(iL + l)\exp \cdot (-l2\pi f/f_s)$$

With the particular values of f and $f_s$ in the present case:

exp. $(-iL2\pi f/f_s)= \pm 1$ or $\pm j$ in a cyclic fashion according to the value of i, which can be carried out a "select" operation.

The computation of dYf(i) at symbol i, as shown schematically in FIG. 15, requires the storage of four pairs of cos and sin values, four x(n) values, four pairs of multiply and accumulate, and two select processes. Computing Yf(i) from four sequential values of dYf(i) then requires four pairs of store and add processes.

In order to detect phase reversals eight pairs of Yf(i) values are stored (M=8), giving a separation of 3.2 ms between the present estimate and the reference estimate.

The values $\cos (112\pi f/f_s)$ and $\sin (112\pi f/f_s)$ are precalculated and stored in a look-up table. If the detector is arranged to look for "−1800 Hz" the "select" operation becomes identical for the two tones.

The change in polarity of the output signal of the tone detector, indicating a phase-reversal, occurs between two comparisons, so that the actual zero crossing can only be specified to an accuracy of ±T/2, where T is one symbol period. If the actual values of the successive dot products are examined to see which is closer in magnitude to zero the zero crossing can then be specified to within half a symbol period, that is to an accuracy of ±T/2. Greater accuracy can be achieved if required with further stages of interpolation.

I claim:

1. A data transmission system in which data signal values to be transmitted over the system are represented in transmission by phase and amplitude values of two electric carrier signals of the same frequency but in phase quadrature, wherein a modem comprises digital signal processor means responsive to input data signal values for supplying digital electric output signals which represent, in pulse code modulation form, the required phase and amplitude values of successive samples of the two electric carrier signals; a digital-to-analog converter which derives said carrier signals from said digital output signals; means for periodically sampling and digitally encoding received carrier signals; and an automatic gain control arrangement comprising means for digitally determining the average magnitude of encoded sample values, means for deriving a reciprocal of said average magnitude, and means for digitally multiplying each of said encoded sample values by said reciprocal of said average magnitude.

* * * * *